US010665384B2

(12) United States Patent
Mairie et al.

(10) Patent No.: US 10,665,384 B2
(45) Date of Patent: May 26, 2020

(54) VOLTAGE STEP-UP AUTOTRANSFORMER, AND AC-TO-DC CONVERTER COMPRISING SUCH AN AUTOTRANSFORMER

(71) Applicant: THALES, Courbevoie (FR)

(72) Inventors: Mathieu Mairie, Chatou (FR); Frederic Lacaux, Kirkland, WA (US); Remy Biaujaud, Villennes sur Seine (FR)

(73) Assignee: THALES, Courbevoie (FR)

( * ) Notice: Subject to any disclaimer, the term of this patent is extended or adjusted under 35 U.S.C. 154(b) by 199 days.

(21) Appl. No.: 16/049,733

(22) Filed: Jul. 30, 2018

(65) Prior Publication Data

US 2019/0035545 A1 Jan. 31, 2019

(30) Foreign Application Priority Data

Jul. 31, 2017 (FR) ..................................... 17 00804
Apr. 26, 2018 (FR) ..................................... 18 00369

(51) Int. Cl.
| | | |
|---|---|---|
| *H01F 30/02* | (2006.01) | |
| *H01F 30/12* | (2006.01) | |
| *H02M 7/08* | (2006.01) | |
| *H02M 5/14* | (2006.01) | |
| *H02M 7/06* | (2006.01) | |

(52) U.S. Cl.
CPC ............. *H01F 30/02* (2013.01); *H01F 30/12* (2013.01); *H02M 5/14* (2013.01); *H02M 7/08* (2013.01); *H02M 7/068* (2013.01)

(58) Field of Classification Search
CPC ................................. H01F 30/02; H01F 30/12
See application file for complete search history.

(56) References Cited

U.S. PATENT DOCUMENTS

| | | | | |
|---|---|---|---|---|
| 2002/0186112 A1* | 12/2002 | Kamath | ................. | H01F 30/02 336/5 |
| 2007/0103125 A1* | 5/2007 | Singh | ..................... | H01F 30/02 323/255 |
| 2008/0130320 A1* | 6/2008 | Bruzy | ..................... | H01F 30/02 363/5 |
| 2008/0186749 A1* | 8/2008 | Blanchery | ............... | H02M 7/08 363/126 |
| 2010/0148899 A1* | 6/2010 | Huang | .................... | H01F 30/14 336/12 |
| 2011/0051480 A1* | 3/2011 | Blanchery | ............. | H02M 7/068 363/154 |
| 2016/0012960 A1* | 1/2016 | Huang | .................... | H02M 7/04 363/64 |

\* cited by examiner

*Primary Examiner* — Elvin G Enad
*Assistant Examiner* — Malcolm Barnes
(74) *Attorney, Agent, or Firm* — Baker & Hostetler LLP

(57) ABSTRACT

A voltage step-up autotransformer topology and an AC-to-DC converter including such an autotransformer are provided. The autotransformer is configured to take, at input, a three-phase AC current (for example 115 VAC with a constant frequency), and to output nine output voltages, which are supplied to an 18-pulse rectifier bridge assembly so as to supply a high DC voltage (for example +270 VDC/−270 VDC). These are particularly suitable for AC-to-DC converters in the aeronautical sector.

10 Claims, 10 Drawing Sheets

US 10,665,384 B2

VOLTAGE STEP-UP AUTOTRANSFORMER, AND AC-TO-DC CONVERTER COMPRISING SUCH AN AUTOTRANSFORMER

CROSS-REFERENCE TO RELATED APPLICATIONS

This application claims priority to foreign French patent applications No. FR 1700804, filed on Jul. 31, 2017, and FR 1800369, filed Apr. 26, 2018, the disclosures of which are incorporated by reference in their entireties.

FIELD OF THE INVENTION

The invention relates to a voltage step-up autotransformer and to an AC-to-DC converter comprising such an autotransformer.

BACKGROUND

In the aeronautical sector, electricity is gradually becoming predominant when it comes to energy over hydraulic or pneumatic energy. On-board aeronautical electrical networks are currently moving towards the use of DC current in combination with a high voltage level, as provided by new HVDC (High Voltage Direct Current) networks. Three-phase AC current (for example 115 VAC with a constant frequency), generated using turbines, is thus converted into a high DC voltage (for example +270 VDC/−270 VDC). To perform such a conversion operation, it is common to use an assembly formed of an autotransformer and of a rectifier bridge assembly, which assembly is able to be referred to under the name ATRU ('Auto Transformer Rectifier Unit'). It will be recalled that an autotransformer is a particular type of transformer in which the whole winding performs the role of primary winding and the part of the winding up to the intermediate point performs the role of secondary winding; the primary winding and the secondary winding thus have a common part without any galvanic isolation between them. For equal nominal power, it is thus less bulky and less heavy than a conventional transformer, this being advantageous in aeronautical applications.

Positioning a rectifier based on capacitors at the output of the autotransformer would reinject, into the AC circuit, currents having frequencies that are harmonics of the frequency of the AC supply current. Thus, the value of the angular phase offset between the voltage and the intensity of the current (also called 'cos phi') would be impaired, as would the total harmonic distortion voltage (also called THDv). In order not to have to use a filtering cell with an autotransformer, and still reduce residual ripple of the DC current and the harmonics reinjected into the network, various solutions involving artificially creating one or two further three-phase networks, most often offset by 20°, 37° or 40°, in an autotransformer by using additional outputs have already been proposed. This structure may then be coupled to a twelve-pulse (for one three-phase network in addition to the main network) or eighteen-pulse (for two three-phase networks in addition to the main network) rectifier.

An autotransformer taking a three-phase voltage at input may, as is known, be represented by a vector diagram. The three input voltages of the three-phase AC network form an equilateral triangle whose centre is the neutral voltage point. The various output voltages may be represented by a vector whose origin is the centre of the triangle, the length of the vector representing the maximum amplitude of the output voltage, and the angle of the vector with respect to a reference vector representing the phase of the output voltage. The windings present on one and the same limb of the autotransformer, which are therefore coupled magnetically as they are flowed through by the same magnetic flux, are represented in parallel on the vector diagram by various segments. The electrical interconnections between the windings are represented on the vector diagram by segment intersections. The length of these segments represents the number of turns of the windings.

Document US 2002/0186112 A1 thus discloses an autotransformer that artificially recreates two three-phase networks in addition to the main network, the second three-phase network thus recreated being offset by a phase of between 35° and 40° (preferably 37°) with respect to the main network, the third recreated three-phase network being offset by a phase of between 35° and 40° (preferably 37°) with respect to the second recreated three-phase network. The amplitudes of the output voltages of the second and third networks are between 0.73 and 0.78 times the output voltage of the first main network, preferably equal to 0.767 times the output voltage of the first main network. The autotransformer is moreover coupled to an 18-pulse rectifier. The document therefore describes what is termed a '37° ' topology. However, the autotransformer described in this document does not provide a solution for containing the mass of the autotransformer. Now, this parameter is decisive in aeronautical applications. Manufacturers commonly change the nominal power rating of the autotransformer, at the expense of a slight impairment of the efficiency, which is compensated for by a high-performance cooling system that most often uses cold plates or specific heat sinks that exhibit a compromise between extraction power and high mass. The problem with this rating choice is the use of cooling solutions that are complex and expensive and even, in the case of the cold plates, difficult to integrate into an already existing system given the complexity of the modifications to be made.

SUMMARY OF THE INVENTION

The invention therefore aims to optimize the mass of an autotransformer by reducing the length of the vectors by modifying its vector diagram, without otherwise making industrialization thereof more complex.

One subject of the invention is therefore a voltage step-up autotransformer, having a magnetic core formed of a first, of a second and of a third limb, said autotransformer being intended to be connected to a three-phase power supply with a given amplitude supplied to a first, to a second and to a third input point and supplying at least three output voltages of a first group of three output voltages in phase with the three-phase power supply and having a given amplitude, the autotransformer comprising:
  a first main winding situated on the first limb between the first and the second input point,
  a second main winding situated on the second limb between the second and the third input point,
  a third main winding situated on the third limb between the third and the first input point,
the first, the second and the third input points being connected electrically to one another in a triangle assembly,
the autotransformer furthermore comprising:
  a first additional winding coupled magnetically to the third main winding and delimited by a first additional terminal where a first voltage of the first group of three output voltages is delivered, the first additional winding being connected to the first input point by way of a first intermediate winding situated on the first limb, the first additional winding and the first intermediate winding being connected to one another by a first terminal, a second additional winding coupled magnetically to the first main winding and delimited by a second additional terminal where a second voltage of the first group of three output voltages is delivered, the second additional winding being connected to the second input point by way of a second intermediate winding situated on the second limb, the second additional winding and the second intermediate winding being connected to one another by a second terminal, a third additional winding coupled magnetically to the second main winding and delimited by a third additional terminal where a third voltage of the first group of three output voltages is delivered, the third additional winding being connected to the third input point by way of a third intermediate winding situated on the third limb, the third additional winding and the third intermediate winding being connected to one another by a third terminal.

Another subject of the invention is a voltage step-up autotransformer, having a magnetic core formed of a first, of a second and of a third limb, said autotransformer being intended to be connected to a three-phase power supply with a given amplitude supplied to a first, to a second and to a third input point and supplying at least three output voltages of a first group of three output voltages in phase with the three-phase power supply and having a given amplitude, the autotransformer comprising:

a first main winding situated on the first limb between the first and the second input point, a second main winding situated on the second limb between the second and the third input point, a third main winding situated on the third limb between the third and the first input point, the first, the second and the third input points being connected electrically to one another in a triangle assembly, the autotransformer furthermore comprising:

a first additional winding coupled magnetically to the first main winding and delimited by a first additional terminal where a first voltage of the first group of three output voltages is delivered, the first additional winding being connected to the first input point by way of a first intermediate winding situated on the third limb, the first additional winding and the first intermediate winding being connected to one another by a first terminal, a second additional winding coupled magnetically to the second main winding and delimited by a second additional terminal where a second voltage of the first group of three output voltages is delivered, the second additional winding being connected to the second input point by way of a second intermediate winding situated on the first limb, the second additional winding and the second intermediate winding being connected to one another by a second terminal, a third additional winding coupled magnetically to the third main winding and delimited by a third additional terminal where a third voltage of the first group of three output voltages is delivered, the third additional winding being connected to the third input point by way of a third intermediate winding situated on the second limb, the third additional winding and the third intermediate winding being connected to one another by a third terminal.

Advantageously, the autotransformer furthermore supplies three output voltages of a second group of three output voltages and three output voltages of a third group of three output voltages and having a desired maximum amplitude different from the desired maximum amplitude of the three output voltages of the first group of three output voltages, the autotransformer comprising:

a first auxiliary winding coupled magnetically to the second main winding, the first auxiliary winding being delimited by the terminal where the first voltage of the second group of three output voltages is delivered and by the terminal where the first voltage of the third group of three output voltages is delivered, the first auxiliary winding being connected to the first intermediate winding at a first intermediate point separate from the first input point, a second auxiliary winding coupled magnetically to the third main winding, the second auxiliary winding being delimited by the terminal where the second voltage of the second group of three output voltages is delivered and by the terminal of the second voltage of the third group of three output voltages, the second auxiliary winding being connected to the second intermediate winding at a second intermediate point separate from the second input point, a third auxiliary winding coupled magnetically to the first main winding, the third auxiliary winding being delimited by the terminal where the third voltage of the second group of three output voltages is delivered and by the terminal of the third voltage of the third group of three output voltages, the third auxiliary winding being connected to the third intermediate winding at a third intermediate point separate from the third input point.

As a variant, the autotransformer furthermore supplies three output voltages of a second group of three output voltages and three output voltages of a third group of three output voltages and having a desired maximum amplitude identical to the desired maximum amplitude of the three output voltages of the first group of three output voltages, the autotransformer comprising:

two first additional windings coupled magnetically to the first main winding and to the third main winding, respectively, delimited by the terminal where the first voltage of the second group of three output voltages is delivered and by the terminal where the first voltage of the third group of three output voltages is delivered, respectively, and connected to the first input point by way of a first auxiliary winding coupled magnetically to the second main winding, two second additional windings coupled magnetically to the second main winding and to the first main winding, respectively, delimited by the terminal where the second voltage of the second group of three output voltages is delivered and by the terminal where the second voltage of the third group of three output voltages is delivered, respectively, and connected to the second input point by way of a second auxiliary winding coupled magnetically to the third main winding, two third additional windings coupled magnetically to the third main winding and to the second main winding, respectively, delimited by the terminal where the third voltage of the second group of three output voltages is delivered and by the terminal where the third voltage of the third group of three output voltages is delivered, respectively, and connected to the third input point by way of a third auxiliary winding coupled magnetically to the first main winding.

As a variant, the autotransformer furthermore supplies three output voltages of a second group of three output voltages and three output voltages of a third group of three output voltages and having a desired maximum amplitude lower than the desired maximum amplitude of the three output voltages of the first group of three output voltages, the autotransformer comprising:

a first auxiliary winding coupled magnetically to the second main winding, the first auxiliary winding being delimited by the terminal where the first voltage of the second group of three output voltages is delivered and by the terminal where the first voltage of the third group of three output voltages is delivered, the first auxiliary winding being connected to the first intermediate winding at the first input point, a second auxiliary winding coupled magnetically to the third main winding, the second auxiliary winding being delimited by the terminal where the second voltage of the second group of three output voltages is delivered and by the terminal of the second voltage of the third group of three output voltages, the second auxiliary winding being connected to the second intermediate winding at the second input point, a third auxiliary winding coupled magnetically to the first main winding, the third auxiliary winding being delimited by the terminal where the third voltage of the second group of three output voltages is delivered and by the terminal of the third voltage of the third group of three output voltages, the third auxiliary winding being connected to the third intermediate winding at the third input point.

As a variant, the autotransformer furthermore supplies three output voltages of a second group of three output voltages and three output voltages of a third group of three output voltages and having desired maximum amplitude lower than the desired maximum amplitude of the three output voltages of the first group of three output voltages, the autotransformer comprising:

two first additional windings coupled magnetically to the first main winding and to the third main winding, respectively, delimited by the terminal where the first voltage of the second group of three output voltages is delivered and by the terminal where the first voltage of the third group of three output voltages is delivered, respectively, and connected to the first input point by way of a first auxiliary winding coupled magnetically to the second main winding, two second additional windings coupled magnetically to the second main winding and to the first main winding, respectively, delimited by the terminal where the second voltage of the second group of three output voltages is delivered and by the terminal where the second voltage of the third group of three output voltages is delivered, respectively, and connected to the second input point by way of a second auxiliary winding coupled magnetically to the third main winding, two third additional windings coupled magnetically to the third main winding and to the second main winding, respectively, delimited by the terminal where the third voltage of the second group of three output voltages is delivered and by the terminal where the third voltage of the third group of three output voltages is delivered, respectively, and connected to the third input point by way of a third auxiliary winding coupled magnetically to the first main winding.

Advantageously, the first, second and third output voltages of the second group of three output voltages are phase-offset by a first phase offset angle, respectively, with respect to the first, second and third output voltages of the first group of three output voltages, and the first, second and third output voltages of the third group of three output voltages being phase-offset by a second phase offset angle, respectively, with respect to the first, second and third output voltages of the first group of three output voltages, the first phase offset angle and the second phase offset angle having the same absolute value, the first phase offset angle being positive and the second phase offset angle being negative.

Advantageously, the phase offset angle is equal to 37°.

As a variant, the phase offset angle is equal to 40°.

The invention also relates to an AC-to-DC converter using an abovementioned autotransformer, a forward-biased diode being linked between each output of the autotransformer and a positive output of the converter, and a reverse-biased diode being linked between each output of the autotransformer and a negative output of the converter.

BRIEF DESCRIPTION OF THE DRAWINGS

Other features, details and advantages of the invention will become apparent upon reading the description provided with reference to the appended drawings, which are given by way of example and in which, respectively.

DETAILED DESCRIPTION

Figure 1:
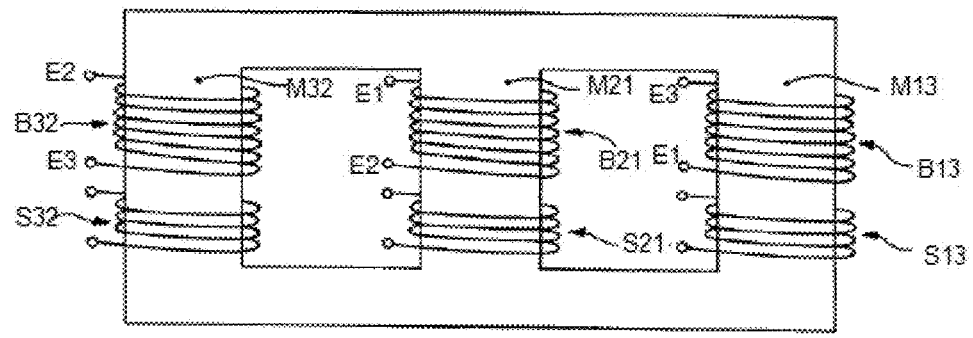
FIG. 1 shows, in simplified form, a three-phase autotransformer.

FIG. 1 shows, in simplified form, an example of a three-phase autotransformer, equipped with windings B32, B21 and B13 comprising input terminals E1, E2 and E3, and with windings S32, S21 and S13 that are not linked to the invention but that allow the operating principle of an autotransformer to be illustrated. The autotransformer comprises a closed ferromagnetic circuit comprising:

a first central limb M21 receiving the windings corresponding to a first phase;

a second lateral limb M32 receiving the windings of a second phase;

and a third lateral limb M13 receiving the windings of a third phase.

Figure 2:
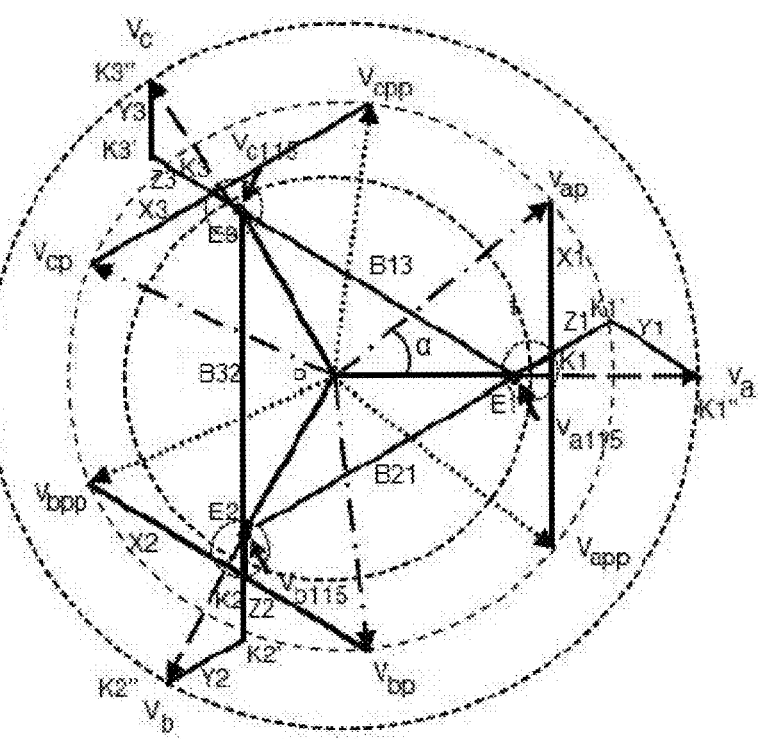
FIG. 2 illustrates a vector diagram representative of a first embodiment of an autotransformer according to the invention.

In the case of a three-phase voltage at input, the magnetic fluxes that flow in each of the limbs of the autotransformer are identical but phase-offset by 120° with respect to one another. Thus, in the diagram of FIG. 2, the vectors OE1, OE2 and OE3, representing the voltages at input, have the same amplitude, and have an angle of 120° between them. As was indicated above, the windings of one and the same limb are all flowed through by the same magnetic flux, and are thus coupled magnetically. For example, in FIG. 2, the segments representing the main winding B21 and an auxiliary winding X3 are shown in parallel; this illustrates the magnetic coupling between the main winding B21 and the auxiliary winding X3, the latter corresponding for example to the winding S21 in the vector representation of the circuit of FIG. 1. It has also been indicated above that each input or output voltage may be represented by a vector whose length represents the amplitude and whose orientation represents the phase from 0° to 360°. Thus, for an autotransformer configured to produce nine phases from three input phases spaced apart by 120°, vector compositions are sought that, from three input phases, make it possible to produce the nine desired phases. In FIG. 2, the three-phase power supply is applied to the terminals of the windings at E1, E2 and E3.

Furthermore, for the vector composition, a neutral point of origin O is arbitrarily defined, and the simple input and output voltages of the autotransformer will be referenced with respect to this point. The three points E1, E2 and E3 form an equilateral triangle whose origin is the point O, thereby implying that the vector sum of the voltages OE1, OE2 and OE3 is zero.

For the autotransformer according to the invention, it is sought to obtain a first group of three output voltages (Va, Vb, Vc), a second group of three output voltages (Vap, Vbp, Vcp) and a third group of three output voltages (Vapp, Vbpp, Vcpp). The voltages of the first group of three output voltages (Va, Vb, Vc) have the same phase as the input voltages. The length of the vectors representing the voltages of the first group of three output voltages (Va, Vb, Vc) depends on the desired output voltage. For example, for a supply voltage at 115 VAC, and an output voltage at +1-270 VDC, there is a coefficient of 2 between the length of the vectors representing the voltages of the first group of three output voltages (Va, Vb, Vc) and the length of the vectors representing the input voltages, this corresponding to the case of a voltage step-up autotransformer. It should be noted that, by changing the length of the vectors representing the output voltages, the output voltage will be different. The vectors representing the voltages of the first group of three output voltages (Va, Vb, Vc) and the vectors of the input voltages are thus collinear. The second group of three output voltages (Vap, Vbp, Vcp) is then constructed from the first group of three output voltages (Va, Vb, Vc). The vector representing the first voltage Vap of the second group of three output voltages (Vap, Vbp, Vcp) has a first phase offset angle of 37° with respect to the vector representing the first voltage Va of the first group of three output voltages (Va, Vb, Vc), and a length equal to 0.767 times the length of the vector denoting the first voltage Va of the first group of three output voltages (Va, Vb, Vc). According to one variant, the first phase offset angle of 37° may be replaced by a first phase offset angle of 40°. The vector representing the voltage Vbp is then deduced from the vector representing the voltage Vap, by an identical length and an angle of 120°; likewise, the vector representing the voltage Vcp is deduced from the vector representing the voltage Vbp, by an identical length and an angle of 120°. The process of constructing the vectors representing the voltages of the third group of three output voltages (Vapp, Vbpp, Vcpp) is similar. The vector representing the voltage Vapp has a length equal to 0.767 times the length of the vector denoting the first voltage Va, with a second phase offset angle of −37° between the two vectors (or of −40° according to one variant). The first phase offset angle and the second phase offset angle have the same absolute value, the first phase offset angle being positive, the second phase offset angle being negative. The vector representing the voltage Vbpp is then deduced from the vector representing the voltage Vapp, by an identical length and an angle of −120°; likewise, the vector representing the voltage Vcpp is deduced from the vector representing the voltage Vbpp, by an identical length and an angle of −120°.

Figure 3:
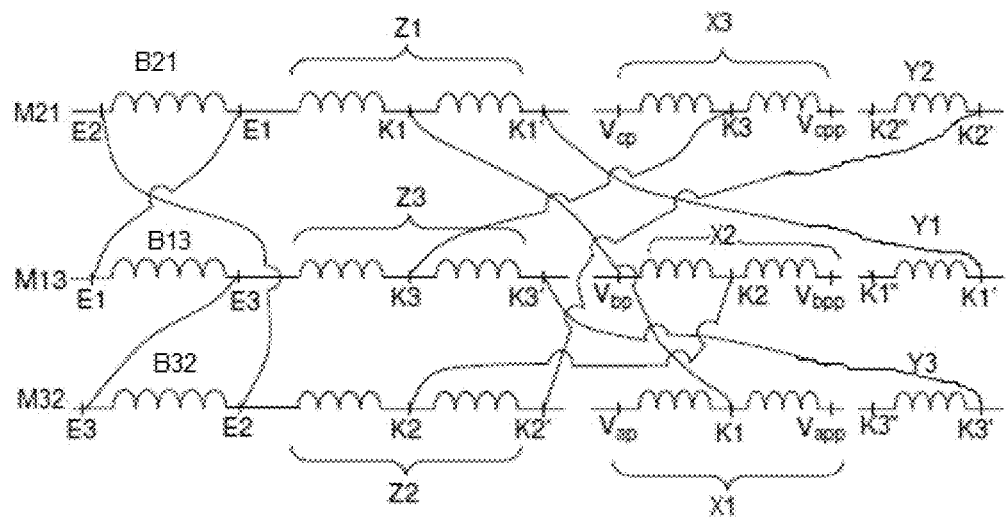
FIG. 3 schematically illustrates the windings provided for the first embodiment.

FIG. 3 illustrates another embodiment of the autotransformer. Having illustrated the magnetic circuit with its limbs M21, M13 and M32 in FIG. 1, we move to FIG. 3, in which only the windings are shown facing the three limbs on which they are fitted, the parallel segments in FIG. 2 corresponding to windings arranged on one and the same limb. These windings are moreover represented by segments in FIG. 2, the amplitude of which segments is representative of the length of the windings, the length of a winding being defined by its number of turns around a limb.

The first limb M21 comprises a first main winding B21 that is moreover represented in FIG. 2. The first main winding B21 extends from the second input point E2 to a first terminal K1'. The length of the first main winding B21, that is to say between the input point E2 and the first terminal K1', is determined such that the point representing the first terminal K1' is on the iso-amplitude circle of the second group of three output voltages (Vap, Vbp, Vcp) and of the third group of three output voltages (Vapp, Vbpp, Vcpp). In the same way, the second limb M32 comprises a second main winding B32 that is also represented in FIG. 2. The second main winding B32 extends from the third input point E3 to a second terminal K2'. The length of the second main winding B32, that is to say between the third input point E3 and the second terminal K2', is determined such that the point representing the second terminal K2' is on the iso-amplitude circle of the second group of three output voltages (Vap, Vbp, Vcp) and of the third group of three output voltages (Vapp, Vbpp, Vcpp). Lastly, the third limb M13 comprises a third main winding B13 that is also represented in FIG. 2. The third main winding B13 extends from the first input point E1 to a third terminal K3'. The length of the third main winding B13, that is to say between the first input point E1 and the third terminal K3', is determined such that the point representing the third terminal K3' is on the iso-amplitude circle of the second group of three output voltages (Vap, Vbp, Vcp) and of the third group of three output voltages (Vapp, Vbpp, Vcpp).

There is a first auxiliary winding X1 on the first limb M21; there is thus magnetic coupling between the first auxiliary winding X1 and the second main winding B32. The length of the first auxiliary winding X1, as a number of turns, is identical to the length of the portion of second main winding B32 situated between the second input point E2 and the third input point E3. The voltages Vap and Vapp are tapped off at the terminals of the first auxiliary winding X1. The first auxiliary winding X1 is moreover connected electrically to the first main winding B21 via a first intermediate point K1. The first auxiliary winding X1 is connected to the first intermediate winding Z1 at a first intermediate point K1 separate from the first input point E1. In FIG. 2, the first intermediate point K1 is situated at the intersection of the segment representing the first main winding B21 and of the segment representing the first auxiliary winding X1. As the location of the first main winding B21 and of the first auxiliary winding X1 are known, the number of turns separating the first input point E1 from the first intermediate point K1 is thus deduced by measuring the distance separating the points E1 and K1 on the vector diagram. Thus, the first intermediate point K1 in the first main winding B21 is at a position such that the ratio n1/N between the number n1 of turns situated between E1 and K1 and the total number N of turns of the first main winding B21 is: n1/N=E1K1/E2K1'. The number of turns n1 is therefore equal to the integer value of N*E1K1/E2K1'. In the same way, by repeating the operations by circular permutation, the number of turns separating the second input point E2 from the second intermediate point K2 is deduced by measuring the distance separating the points E2 and K2 on the vector diagram, and the number of turns separating the third input point E3 from the third intermediate point K3 is deduced by measuring the distance separating the points E3 and K3 on the vector diagram. The second auxiliary winding X2 is connected to the second intermediate winding Z2 at a second intermediate point K2 separate from the second input point E2. The third auxiliary winding X3 is connected to the third intermediate winding Z3 at a third intermediate point K3 separate from the third input point E3. The turns of the various windings of the autotransformer according to the present invention may be produced with an aluminium strip, or else with copper wires.

We then have a first additional winding Y1, delimited by the first terminal whose location is known on the vector diagram, and by a first additional terminal K1". The first additional winding Y1 is coupled magnetically to the third main winding B13, and is situated on the third limb M13. The location of the first additional terminal K1" is therefore deduced by constructing a segment representing the first additional winding Y1 parallel to the segment representing the third main winding B13, the first additional terminal K1" being situated at the intersection of the segment representing the first additional winding Y1 and of the tap-off point of the voltage Va. The first additional winding Y1 is connected to the first input point E1 by way of the first intermediate winding Z1 situated on the first limb M21. The first additional winding Y1 and the first intermediate winding Z1 are connected to one another by the first terminal K1'. In the same way, by repeating the operations by circular permutation, the location of the second additional terminal K2" is deduced therefrom. The second additional winding Y2 is connected to the second input point E2 by way of a second intermediate winding Z2 situated on the second limb M32. The second additional winding Y2 and the second intermediate winding Z2 are connected to one another by a second terminal K2'. In the same way, by repeating the operations by circular permutation, the location of the third additional terminal K3" is deduced therefrom. The third additional winding Y3 is connected to the third input point E3 by way of a third intermediate winding Z3 situated on the third limb M13. The third additional winding Y3 and the third intermediate winding Z3 are connected to one another by a third terminal K3'. This topology advantageously makes it possible to reduce the length of the vectors transiting the total current and therefore the length and the associated volume of winding in the autotransformer, and then to optimally distribute, in the other windings, the power to the outputs of the autotransformer, that is to say optimally distribute the currents and reduce the apparent electric power of the transformer ('kVA rating'). Improved distribution of the currents makes it possible to minimize the cross section of the windings and therefore their total volume. A reduction in the mass of the windings is thus achieved. This reduction in mass may advantageously be of the order of 10 to 15%.

FIG. 3 schematically illustrates the windings provided for the first embodiment as described in relation to FIG. 2, making it possible to see the way in which the various points are connected, on the various limbs of the autotransformer in accordance with the above description. In the same way, FIG. 5 schematically illustrates the windings provided for the second embodiment as described in relation to FIG. 4.

Figure 4:
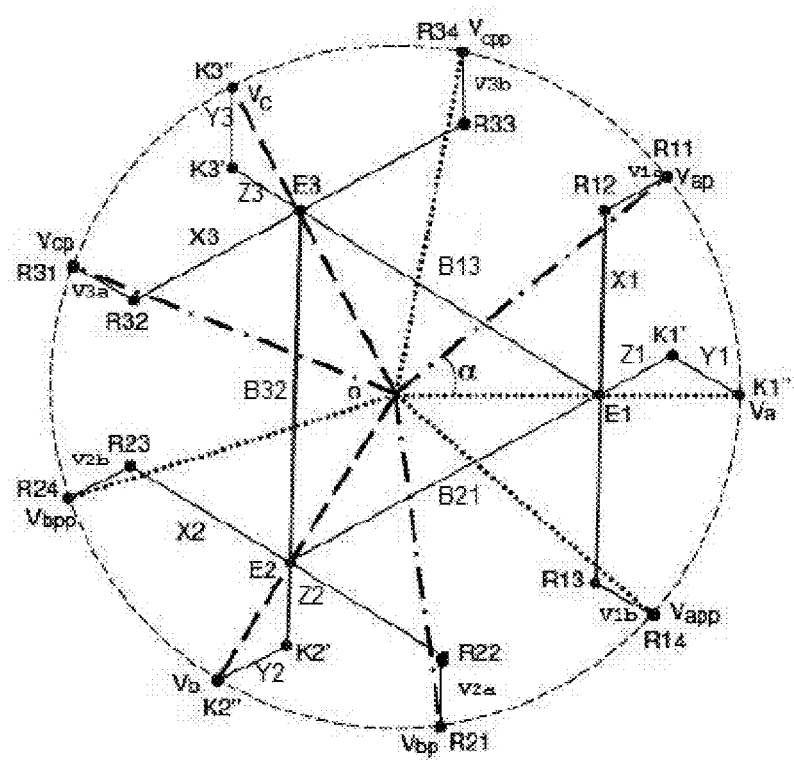
FIG. 4 illustrates a vector diagram representative of a second embodiment of an autotransformer according to the invention.
Figure 5:
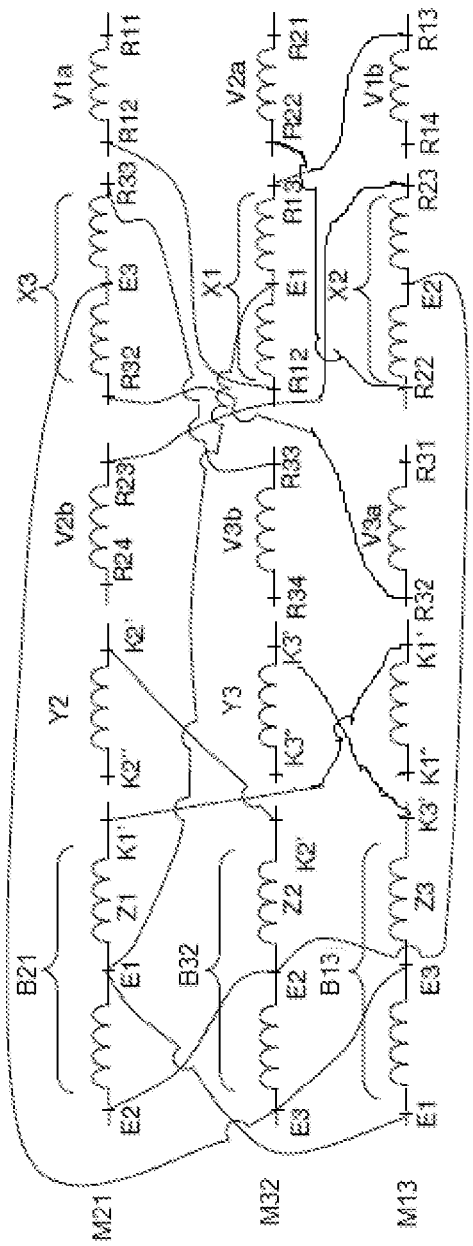
FIG. 5 schematically illustrates the windings provided for the second embodiment.

FIG. 4 illustrates a vector diagram representative of the topology of a second embodiment of the invention. The convention of representing the three-phase power supply with E1, E2 and E3 is identical to the previous embodiment. For this embodiment, it is sought to obtain a first group of three output voltages (Va, Vb, Vc), a second group of three output voltages (Vap, Vbp, Vcp) and a third group of three output voltages (Vapp, Vbpp, Vcpp), the voltages of the three groups this time having the same maximum amplitude. The construction of the vectors representing the various groups of output voltages is identical to the previous embodiment. The vector representing the first voltage Vap of the second group of three output voltages (Vap, Vbp, Vcp) has a first phase offset angle α with respect to the vector representing the first voltage Va of the first group of three output voltages (Va, Vb, Vc), and a length equal to the length of the vector denoting the first voltage Va of the first group of three output voltages (Va, Vb, Vc). The first phase offset angle α may be equal to 37° or equal to 40°. The vector representing the voltage Vbp is then deduced from the vector representing the voltage Vap, by an identical length and an angle of 120°; likewise, the vector representing the voltage Vcp is deduced from the vector representing the voltage Vbp, by an identical length and an angle of 120°. The process of constructing the vectors representing the voltages of the third group of three output voltages (Vapp, Vbpp, Vcpp) is similar to the embodiment described above.

The second embodiment is distinguished from the first embodiment in that the first input point E1 is coincident with the first intermediate point K1. The number of interconnections between the various limbs of the autotransformer is therefore reduced in comparison with the previous embodiment. The auxiliary winding X1 is coupled magnetically to the second main winding B32, and is thus situated on the second limb M32. Two additional windings V1a and V1b, represented by the segments R11-R12 and R13-R14, respectively, on the diagram of FIG. 4, are coupled magnetically to the first main winding B21 and to the third main winding B13, respectively, and are therefore situated on the limbs M21 and M13 of the autotransformer, respectively. We thus obtain symmetry of the windings about the auxiliary winding X1, and therefore improved distribution of the currents due to the proximity of the values of the impedances. The points K1" (representing the voltage Va), K2" (representing the voltage Vb), K3" (representing the voltage Vc), R11 (representing the voltage Vap), R34 (representing the voltage Vcpp), R31 (representing the voltage Vcp), R24 (representing the voltage Vbpp) and R21 (representing the voltage Vbp) have a known location, insofar as they are all inscribed within the circle of centre O. The point R12, which is one of the two terminals of the additional winding V1a with the point R11, is determined geometrically by constructing the intersection between the auxiliary winding X1 and the additional winding V1a. The number of turns of the additional winding V1a is such that the ratio n1a/N between the number n1a of turns forming the additional winding V1a and the total number N of turns of the first main winding B21 is: n1a/N=R12R11/E2K1'. The number of turns n1a is therefore equal to the integer value of N*R12R11/E2K1'. By symmetry, the number of turns of the additional winding V1b is deduced therefrom. In the same way, by repeating the operations by circular permutation, the number of turns of the additional windings V2a, V2b, V3a and V3b is deduced therefrom. The first phase offset angle α may be equal to 37° or 40°. To switch from one to the other, it is sufficient to change the lengths of segments representing the auxiliary windings and the additional windings. For example, to switch from 37° to 40°, it is sufficient to reduce the length of the segment representing the additional winding Via, and to increase the length of the segment representing the auxiliary winding X1. Switching to a first phase offset angle α equal to 40° advantageously makes it possible to eliminate the common mode voltage, and therefore to dispense with a cumbersome, heavy and expensive common mode filter.

Figure 6:
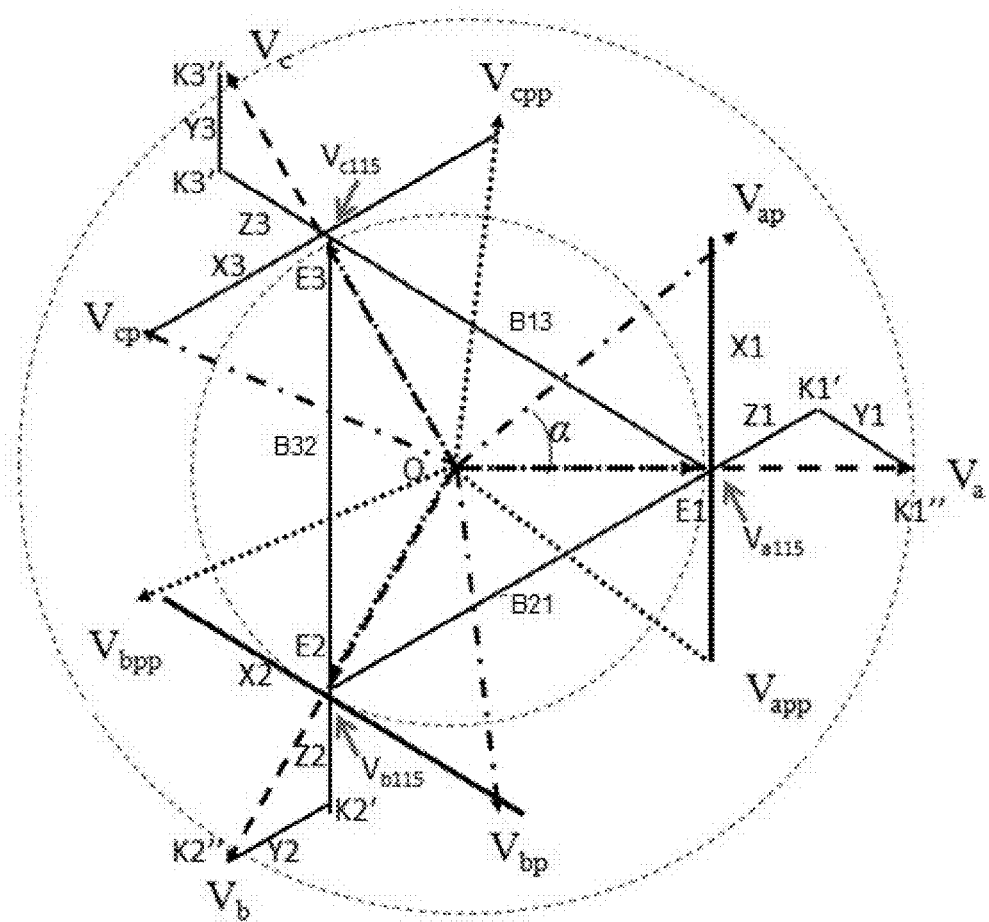
FIG. 6 illustrates a vector diagram representative of a third embodiment of an autotransformer according to the invention.
Figure 7:
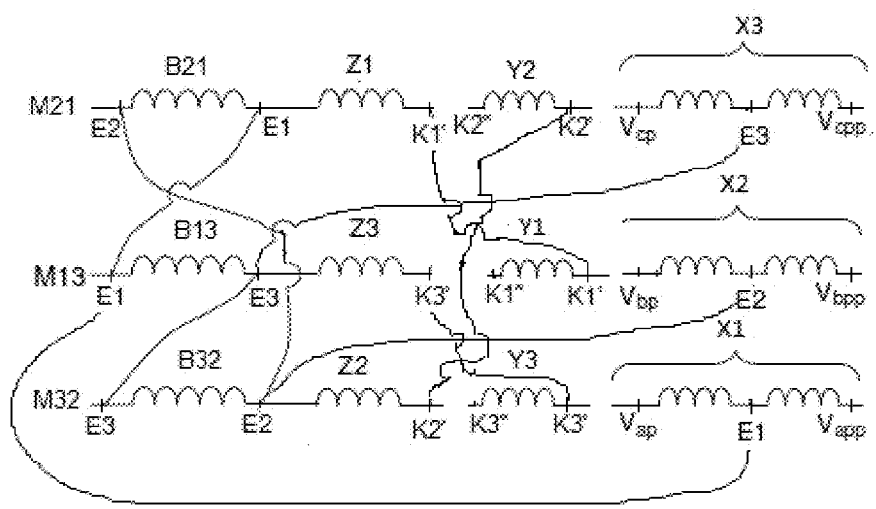
FIG. 7 schematically illustrates the windings provided for the third embodiment.

FIGS. 6 and 7 illustrate a third embodiment of the invention. This embodiment is distinguished from the first embodiment by increased simplicity of the interconnections, as illustrated in particular by FIG. 7. The interconnections are simplified on account of the fact that the first input point E1 is coincident with the first intermediate point K1 (as is the case for E2 with K2 and E3 with K3). The configuration of the windings based on the topology illustrated by FIGS. 6 and 7 is similar to that of the first embodiment.

Figure 8:
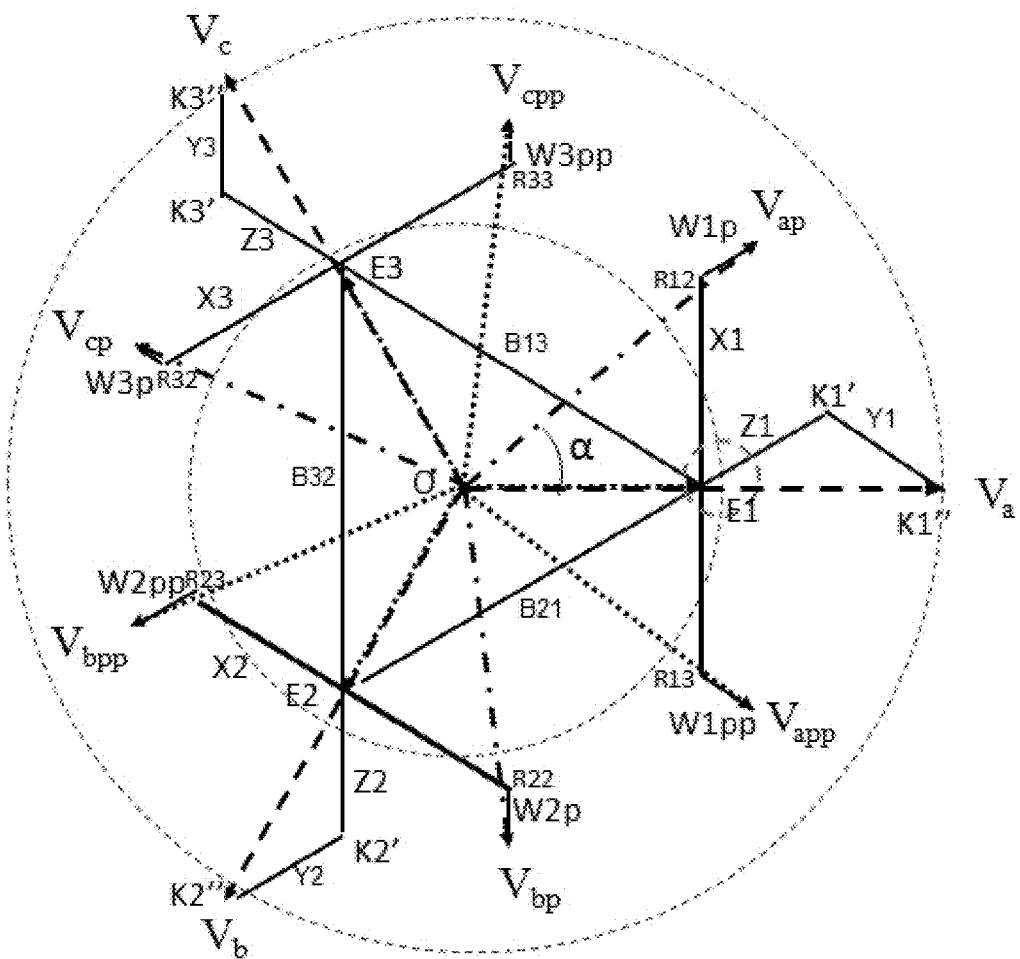
FIG. 8 illustrates a vector diagram representative of a fourth embodiment of an autotransformer according to the invention.
Figure 9:
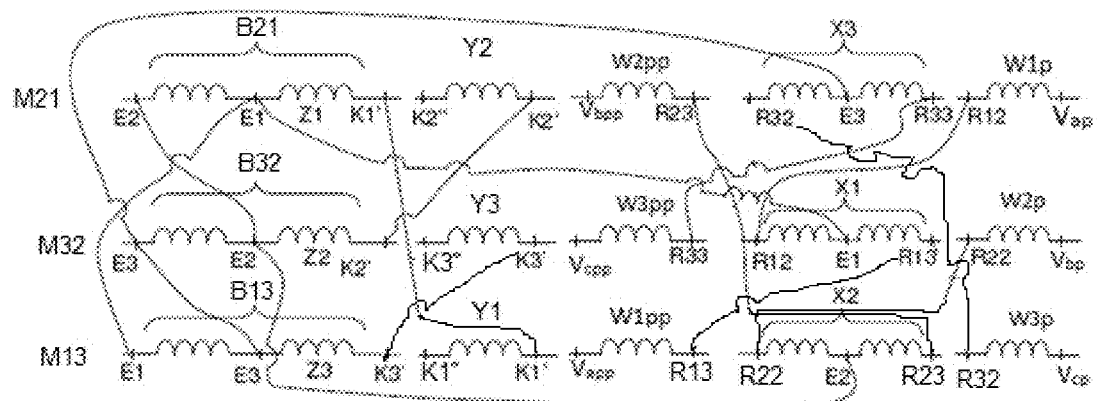
FIG. 9 schematically illustrates the windings provided for the fourth embodiment.

FIGS. 8 and 9 illustrate a fourth embodiment of the invention. The first additional windings (W1p, W1pp), second additional windings (W2p, W2pp) and third additional windings (W3p, W3pp) are created in order to increase the desired maximum output voltages in comparison with the third embodiment. The configuration of the windings based on the topology illustrated by FIGS. 8 and 9 is similar to that of the second embodiment.

FIGS. 10 to 13 show alternatives to the four embodiments described above.

Figure 10:
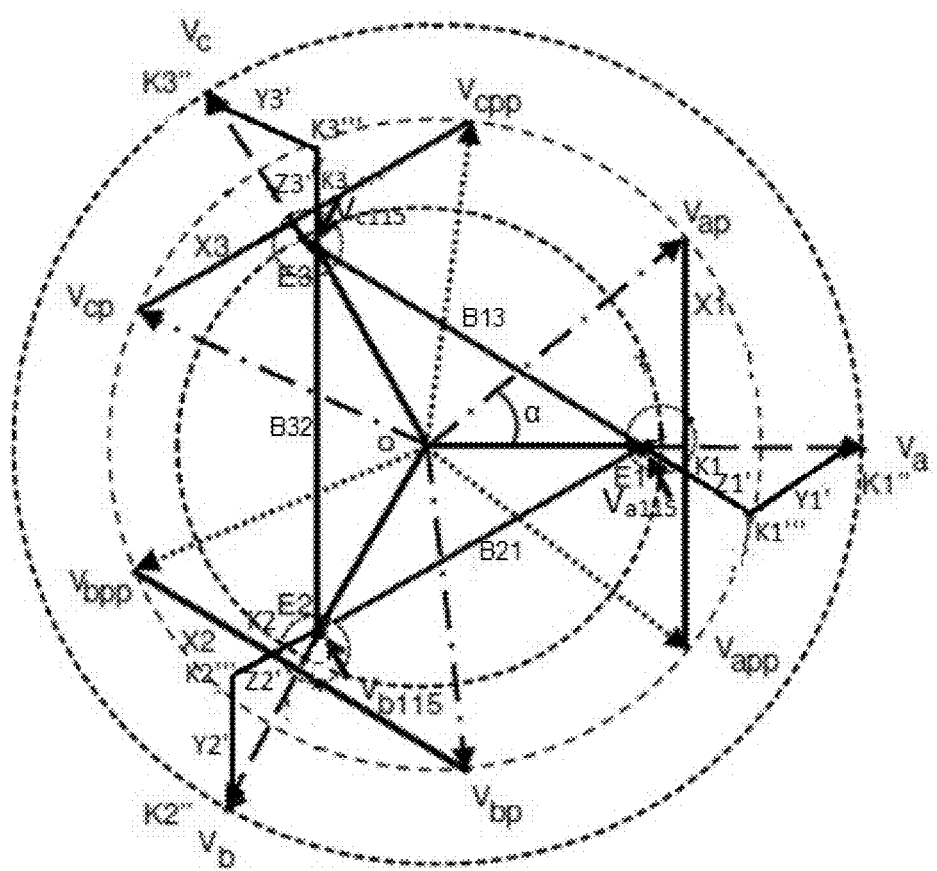
FIGS. 10 to 13 illustrate vector diagrams of alternatives to the four abovementioned embodiments.

FIG. 10 illustrates an alternative to the first embodiment. According to the first embodiment, illustrated by FIGS. 2 and 3, the first intermediate winding Z1 is connected to the first input point E1 on the first main winding B21, and the first additional winding Y1 is coupled magnetically to the third main winding B13. According to the variant illustrated by FIG. 10, the first intermediate winding Z1' is connected to the first input point E1 on the third main winding B13, and the first additional winding Y1' is coupled magnetically to the first main winding B21. The first additional winding Y1' and the first intermediate winding Z1' are connected to one another by a first terminal K1'''.

Likewise, according to the first embodiment, illustrated by FIGS. 2 and 3, the second intermediate winding Z2 is connected to the second input point E2 on the second main winding B32, and the second additional winding Y2 is coupled magnetically to the first main winding B21. According to the variant illustrated by FIG. 10, the second intermediate winding Z2' is connected to the second input point E2 on the first main winding B21, and the second additional winding Y2' is coupled magnetically to the second main winding B32. The second additional winding Y2' and the second intermediate winding Z2' are connected to one another by a second terminal K2'''.

Lastly, according to the first embodiment, illustrated by FIGS. 2 and 3, the third intermediate winding Z3 is con-
nected to the third input point E3 on the third main winding B13, and the third additional winding Y3 is coupled magnetically to the second main winding B32. According to the variant illustrated by FIG. 10, the third intermediate winding Z3' is connected to the third input point E3 on the second main winding B32, and the third additional winding Y3' is coupled magnetically to the third main winding B13. The third additional winding Y3' and the third intermediate winding Z3' are connected to one another by a third terminal K3''.

Figure 11:
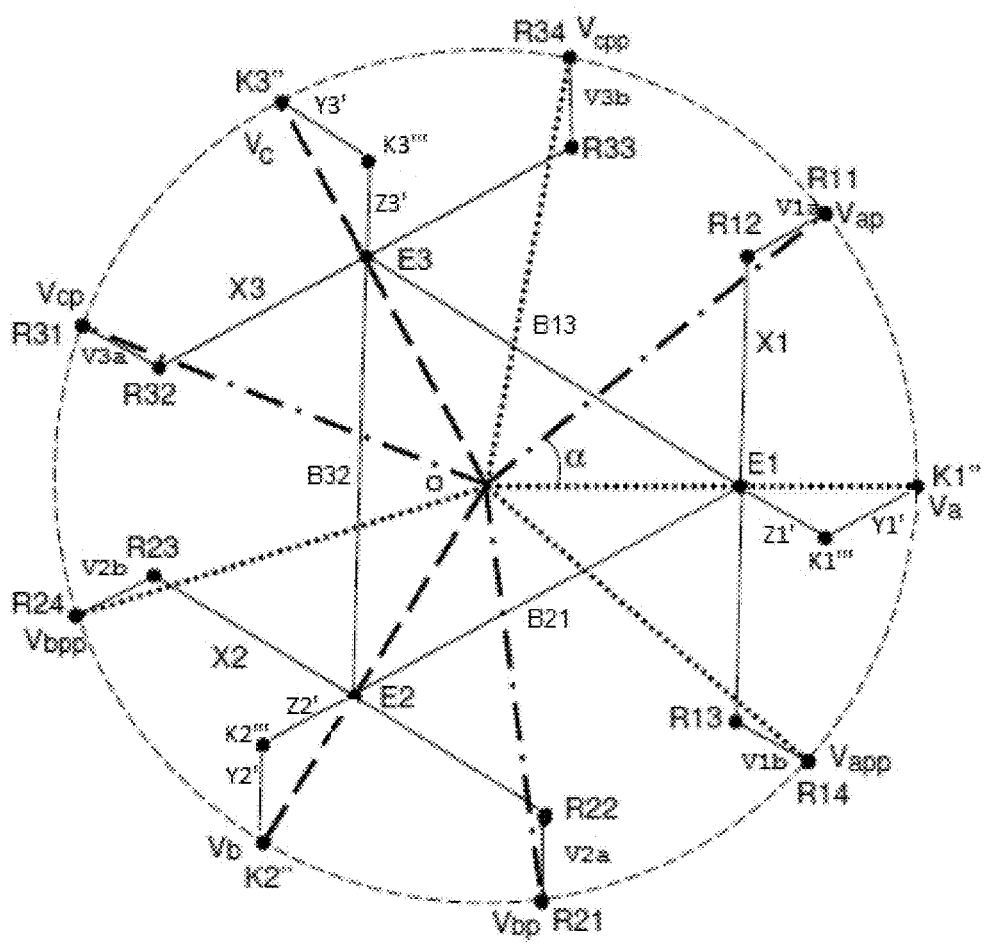
Figure 12:
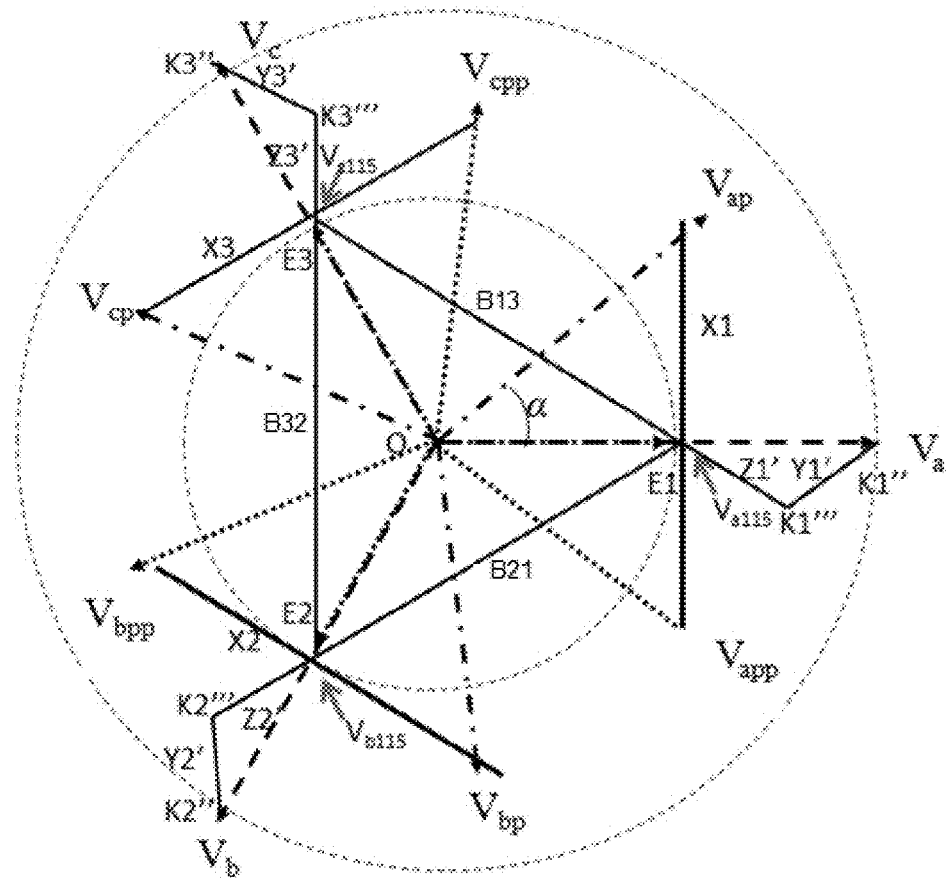
Figure 13:
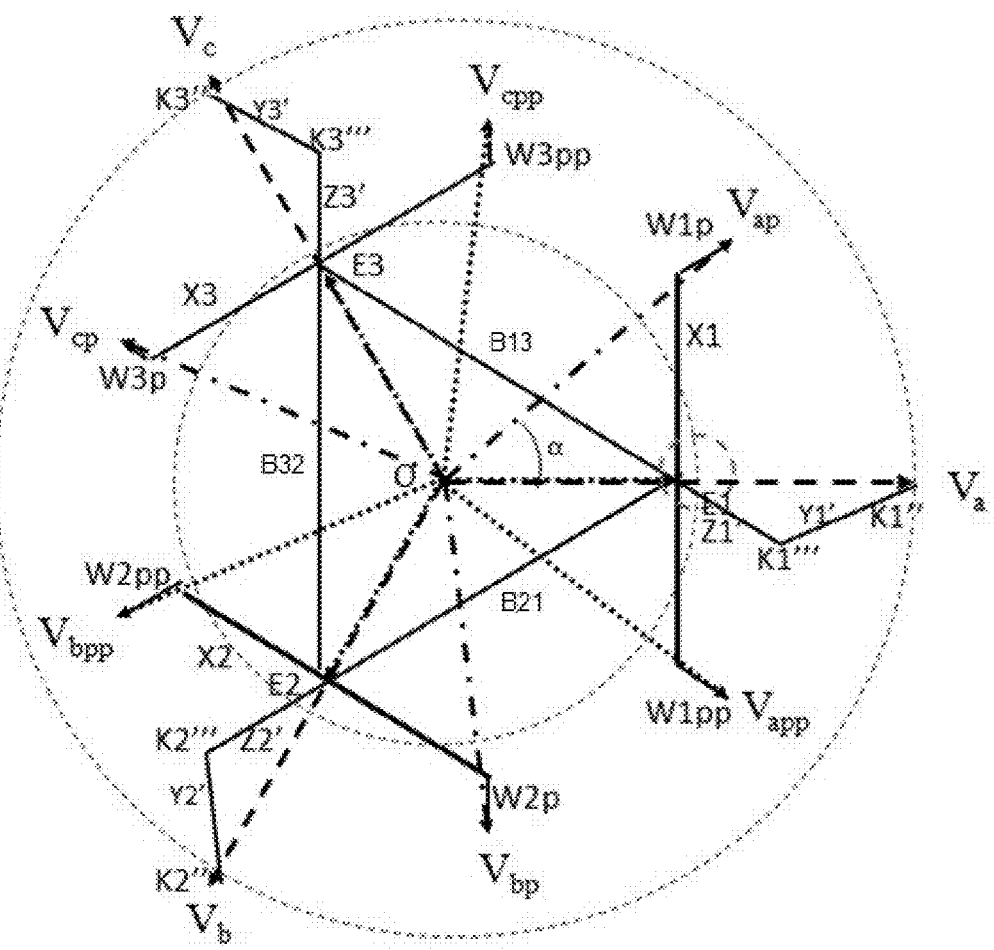

FIGS. 11, 12 and 13 show an alternative to the embodiment illustrated by FIGS. 4 and 5, by FIGS. 6 and 7 and by FIGS. 8 and 9, respectively, the additional windings and the intermediate windings being constructed in the same way as for FIG. 10, as described in the previous paragraph.

Figure 14:
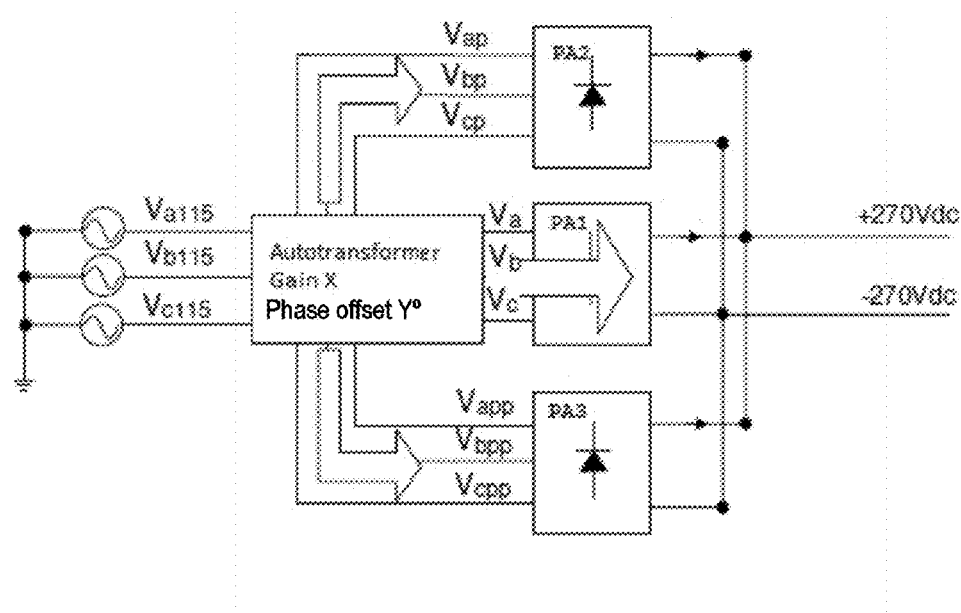
FIG. 14 schematically illustrates an 18-pulse autotransformer-rectifier according to the invention.

FIG. 14 shows an overview of an AC-to-DC converter, including an autotransformer according to one of the embodiments described above, followed by three rectifier bridges, one bridge being associated with each group of three-phase voltages. The autotransformer is thus advantageously used to perform an AC-to-DC voltage conversion. The three-phase power supply is thus connected to the autotransformer at the inputs E1, E2 and E3. The three output voltage groups are recovered at the output of the autotransformer. The voltages of the first group of three output voltages (Va, Vb, Vc) are connected to a first bridge PA1 formed, as is conventional, of six diodes. The outputs phase-offset by +37° (or +40°) are connected to a second bridge PA2 of six diodes, and the outputs phase-offset by −37° (or −40°) are connected to a third bridge of six diodes. The three rectifier bridges have common outputs that form the outputs of the converter. The assembly of the three bridges of six diodes delivers an 18-pulse pseudo-DC voltage.

The various parameters of the autotransformer, such as the angle of 37° or of 40° (phase), and the ratio between the AC voltage at input and the desired DC output voltage (gain) may be selected with the aim of minimizing the amount of energy flowing through the autotransformer, and at the same time ensuring a conversion with 18 pulses.

In the present application, the voltage is, by convention, positive in the anticlockwise direction (E1-E3-E2). A person skilled in the art will easily be able to modify the interconnections if he uses another convention (positive voltages in the clockwise direction).

The present description applies to a voltage step-up autotransformer. However, it could also apply to a voltage step-down autotransformer. To this end, it would be necessary to modify the windings of the vectors representing the voltages Va, Vb, Vc so that these vectors are shorter than for a step-up voltage autotransformer, or else apply windings that will make these vectors be in a triangle, and then consequently modify the length of the vectors Vap, Vapp while also changing the length of the vectors creating them.

The invention claimed is:

1. A voltage step-up autotransformer, having a magnetic core formed of a first, of a second and of a third limb, said autotransformer being intended to be connected to a three-phase power supply with a given amplitude supplied to a first, to a second and to a third input point and supplying at least three output voltages of a first group of three output voltages in phase with the three-phase power supply and having a given amplitude, the autotransformer comprising:
a first main winding situated on the first limb between the first and the second input point, a second main winding situated on the second limb between the second and the third input point, a third main winding situated on the third limb between the third and the first input point, the first, the second and the third input points being connected electrically to one another in a triangle assembly, wherein the autotransformer furthermore comprises:

a first additional winding coupled magnetically to the third main winding and delimited by a first additional terminal where a first voltage of the first group of three output voltages is delivered, the first additional winding being connected to the first input point by way of a first intermediate winding situated on the first limb, the first additional winding and the first intermediate winding being connected to one another by a first terminal, a second additional winding coupled magnetically to the first main winding and delimited by a second additional terminal where a second voltage of the first group of three output voltages is delivered, the second additional winding being connected to the second input point by way of a second intermediate winding situated on the second limb, the second additional winding and the second intermediate winding being connected to one another by a second terminal, a third additional winding coupled magnetically to the second main winding and delimited by a third additional terminal where a third voltage of the first group of three output voltages is delivered, the third additional winding being connected to the third input point by way of a third intermediate winding situated on the third limb, the third additional winding and the third intermediate winding being connected to one another by a third terminal.

2. A voltage step-up autotransformer, having a magnetic core formed of a first, of a second and of a third limb, said autotransformer being intended to be connected to a three-phase power supply with a given amplitude supplied to a first, to a second and to a third input point and supplying at least three output voltages of a first group of three output voltages in phase with the three-phase power supply and having a given amplitude, the autotransformer comprising:

a first main winding situated on the first limb between the first and the second input point, a second main winding situated on the second limb between the second and the third input point, a third main winding situated on the third limb between the third and the first input point, the first, the second and the third input points being connected electrically to one another in a triangle assembly, wherein the autotransformer furthermore comprises:

a first additional winding coupled magnetically to the first main winding and delimited by a first additional terminal where a first voltage of the first group of three output voltages is delivered, the first additional winding being connected to the first input point by way of a first intermediate winding situated on the third limb, the first additional winding and the first intermediate winding being connected to one another by a first terminal, a second additional winding coupled magnetically to the second main winding and delimited by a second additional terminal where a second voltage of the first group of three output voltages is delivered, the second additional winding being connected to the second input point by way of a second intermediate winding situated on the first limb, the second additional winding and the second intermediate winding being connected to one another by a second terminal, a third additional winding coupled magnetically to the third main winding and delimited by a third additional terminal where a third voltage of the first group of three output voltages is delivered, the third additional winding being connected to the third input point by way of a third intermediate winding situated on the second limb, the third additional winding and the third intermediate winding being connected to one another by a third terminal.

3. The autotransformer according to claim 1, furthermore supplying three output voltages of a second group of three output voltages and three output voltages of a third group of three output voltages and having a desired maximum amplitude different from the desired maximum amplitude of the three output voltages of the first group of three output voltages, the autotransformer comprising:

a first auxiliary winding coupled magnetically to the second main winding, the first auxiliary winding being delimited by the terminal where the first voltage of the second group of three output voltages is delivered and by the terminal where the first voltage of the third group of three output voltages is delivered, the first auxiliary winding being connected to the first intermediate winding at a first intermediate point separate from the first input point, a second auxiliary winding coupled magnetically to the third main winding, the second auxiliary winding being delimited by the terminal where the second voltage of the second group of three output voltages is delivered and by the terminal of the second voltage of the third group of three output voltages, the second auxiliary winding being connected to the second intermediate winding at a second intermediate point separate from the second input point, a third auxiliary winding coupled magnetically to the first main winding, the third auxiliary winding being delimited by the terminal where the third voltage of the second group of three output voltages is delivered and by the terminal of the third voltage of the third group of three output voltages, the third auxiliary winding being connected to the third intermediate winding at a third intermediate point separate from the third input point.

4. The autotransformer according to claim 1, furthermore supplying three output voltages of a second group of three output voltages and three output voltages of a third group of three output voltages and having a desired maximum amplitude identical to the desired maximum amplitude of the three output voltages of the first group of three output voltages, the autotransformer comprising:

two first additional windings coupled magnetically to the first main winding and to the third main winding, respectively, delimited by the terminal where the first voltage of the second group of three output voltages is delivered and by the terminal where the first voltage of the third group of three output voltages is delivered, respectively, and connected to the first input point by way of a first auxiliary winding coupled magnetically to the second main winding, two second additional windings coupled magnetically to the second main winding and to the first main winding, respectively, delimited by the terminal where the second voltage of the second group of three output voltages is delivered and by the terminal where the second voltage of the third group of three output voltages is delivered, respectively, and connected to the second input point by way of a second auxiliary winding coupled magnetically to the third main winding, two third additional windings coupled magnetically to the third main winding and to the second main winding, respectively, delimited by the terminal where the third voltage of the second group of three output voltages is delivered and by the terminal where the third voltage of the third group of three output voltages is delivered, respectively, and connected to the third input point by way of a third auxiliary winding coupled magnetically to the first main winding.

5. The autotransformer according to claim 1, furthermore supplying three output voltages of a second group of three output voltages and three output voltages of a third group of three output voltages and having a desired maximum amplitude lower than the desired maximum amplitude of the three output voltages of the first group of three output voltages, the autotransformer comprising:

a first auxiliary winding coupled magnetically to the second main winding, the first auxiliary winding being delimited by the terminal where the first voltage of the second group of three output voltages is delivered and by the terminal where the first voltage of the third group of three output voltages is delivered, the first auxiliary winding being connected to the first intermediate winding at the first input point, a second auxiliary winding coupled magnetically to the third main winding, the second auxiliary winding being delimited by the terminal where the second voltage of the second group of three output voltages is delivered and by the terminal of the second voltage of the third group of three output voltages, the second auxiliary winding being connected to the second intermediate winding at the second input point, a third auxiliary winding coupled magnetically to the first main winding, the third auxiliary winding being delimited by the terminal where the third voltage of the second group of three output voltages is delivered and by the terminal of the third voltage of the third group of three output voltages, the third auxiliary winding being connected to the third intermediate winding at the third input point.

6. The autotransformer according to claim 1, furthermore supplying three output voltages of a second group of three output voltages and three output voltages of a third group of three output voltages and having a desired maximum amplitude lower than the desired maximum amplitude of the three output voltages of the first group of three output voltages, the autotransformer comprising:

two first additional windings coupled magnetically to the first main winding and to the third main winding, respectively, delimited by the terminal where the first voltage of the second group of three output voltages is delivered and by the terminal where the first voltage of the third group of three output voltages is delivered, respectively, and connected to the first input point by way of a first auxiliary winding coupled magnetically to the second main winding, two second additional windings coupled magnetically to the second main winding and to the first main winding, respectively, delimited by the terminal where the second voltage of the second group of three output voltages is delivered and by the terminal where the second voltage of the third group of three output voltages is delivered, respectively, and connected to the second input point by way of a second auxiliary winding coupled magnetically to the third main winding, two third additional windings coupled magnetically to the third main winding and to the second main winding, respectively, delimited by the terminal where the third voltage of the second group of three output voltages is delivered and by the terminal where the third voltage of the third group of three output voltages is delivered, respectively, and connected to the third input point by way of a third auxiliary winding coupled magnetically to the first main winding.

7. The autotransformer according to claim 3, the first, second and third output voltages of the second group of three output voltages being phase-offset by a first phase offset angle ($\alpha$), respectively, with respect to the first, second and third output voltages of the first group of three output voltages, and the first, second and third output voltages of the third group of three output voltages being phase-offset by a second phase offset angle, respectively, with respect to the first, second and third output voltages of the first group of three output voltages, the first phase offset angle and the second phase offset angle having the same absolute value ($\alpha$), the first phase offset angle being positive and the second phase offset angle being negative.

8. The autotransformer according to claim 1, the phase offset angle ($\alpha$) being equal to 37°.

9. The autotransformer according to claim 7, the phase offset angle ($\alpha$) being equal to 40°.

10. An AC-to-DC converter, wherein it uses an autotransformer according to claim 1, a forward-biased diode being linked between each output of the autotransformer and a positive output of the converter, and a reverse-biased diode being linked between each output of the autotransformer and a negative output of the converter.

\* \* \* \* \*